(12) United States Patent
Aoki

(10) Patent No.: US 8,238,432 B2
(45) Date of Patent: Aug. 7, 2012

(54) WEIGHTED PREDICTION INFORMATION CALCULATION METHOD, APPARATUS, AND PROGRAM, AND VIDEO CODING METHOD, APPARATUS, AND PROGRAM

(75) Inventor: Hirofumi Aoki, Tokyo (JP)

(73) Assignee: NEC Corportion, Tokyo (JP)

( * ) Notice: Subject to any disclaimer, the term of this patent is extended or adjusted under 35 U.S.C. 154(b) by 396 days.

(21) Appl. No.: 12/529,864

(22) PCT Filed: Mar. 4, 2008

(86) PCT No.: PCT/JP2008/053874
§ 371 (c)(1),
(2), (4) Date: Sep. 3, 2009

(87) PCT Pub. No.: WO2008/108372
PCT Pub. Date: Sep. 12, 2008

(65) Prior Publication Data
US 2010/0104016 A1    Apr. 29, 2010

(30) Foreign Application Priority Data

Mar. 5, 2007  (JP) ................................. 2007-054605
Jan. 15, 2008  (JP) ................................. 2008-005636

(51) Int. Cl.
*H04N 7/12* (2006.01)
(52) U.S. Cl. ......... 375/240.16; 375/240.13; 375/240.14; 375/240.17; 375/240.18; 375/240.24
(58) Field of Classification Search ............ 375/240.13, 375/240.14, 240.15, 240.16, 240.17, 240.18, 375/240.24
See application file for complete search history.

(56) References Cited

U.S. PATENT DOCUMENTS

| 2004/0057523 | A1* | 3/2004 | Koto et al. ............... 375/240.26 |
| 2007/0086526 | A1* | 4/2007 | Koto et al. ............... 375/240.16 |
| 2007/0153899 | A1* | 7/2007 | Koto et al. ............... 375/240.16 |
| 2010/0002768 | A1* | 1/2010 | Chujoh et al. ........... 375/240.14 |
| 2010/0118957 | A1* | 5/2010 | Demos ..................... 375/240.15 |

FOREIGN PATENT DOCUMENTS

| JP | 2004-7379 A   | 1/2004  |
| JP | 2005-217746 A | 8/2005  |
| JP | 2005-303942 A | 10/2005 |
| JP | 2006-54802 A  | 2/2006  |
| JP | 2006-509467 A | 3/2006  |

OTHER PUBLICATIONS

International Search Report for PCT/JP2008/053874 mailed Jun. 3, 2008.
International Telecommunication Union, "Advanced Video Coding for Generic Audiovisual Services", ITU-T Recommendation H.264, Mar. 2005, pp. 157-159.
J. Boyce, "Weighted Prediction in the H.264/MPEG AVC Video Coding Standard", IEEE Proceedings of the ISCAS 2004, pp. 789-792, vol. 3.

* cited by examiner

*Primary Examiner* — Ayaz Sheikh
*Assistant Examiner* — Andrew C Lee
(74) *Attorney, Agent, or Firm* — Michael Dryja

(57) ABSTRACT

A weighting factor calculation unit (1903) calculates a weighting factor using characteristics respectively corresponding to a picture to be predicted and a selected reference picture in accordance with a weighting factor equation derived from a fade effect generation principle. For each picture, an intra-picture characteristic calculation unit (1901) calculates the characteristics as characteristics closed in the picture. The weighting factor of a fade picture can be obtained with a small calculation amount at high accuracy.

14 Claims, 6 Drawing Sheets

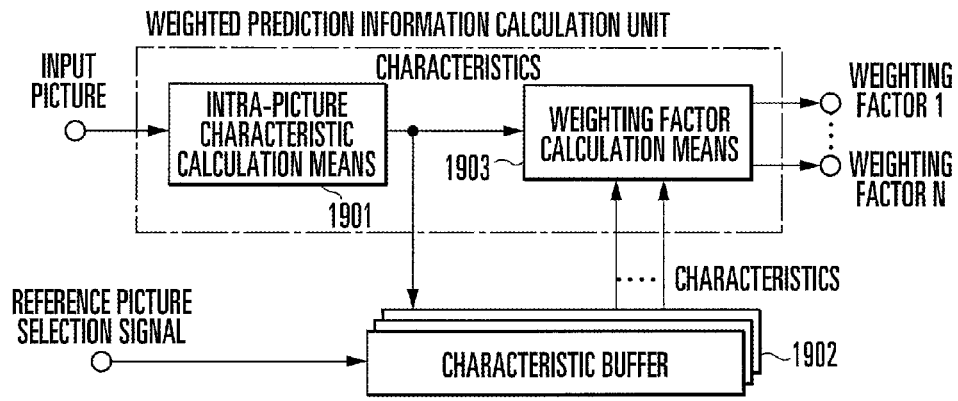
FIG. 1
FIG. 2
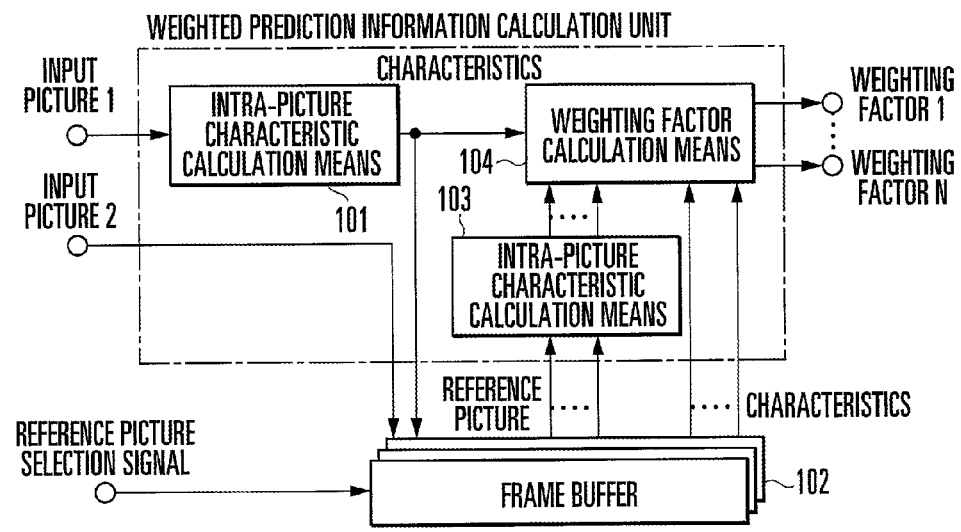
FIG. 3

| 128 | 128 | 128 | 256 | 128 | 128 | 128 |
|---|---|---|---|---|---|---|
| 128 | 128 | 256 | 0 | 256 | 128 | 128 |
| 128 | 256 | 0 | 0 | 0 | 256 | 128 |
| 128 | 128 | 256 | 0 | 256 | 128 | 128 |
| 128 | 128 | 128 | 256 | 128 | 128 | 128 |

FIG. 4

| 128 | 128 | 128 | 128 | 256 | 128 | 128 |
|---|---|---|---|---|---|---|
| 128 | 128 | 128 | 256 | 0 | 256 | 128 |
| 128 | 128 | 256 | 0 | 0 | 0 | 256 |
| 128 | 128 | 128 | 256 | 0 | 256 | 128 |
| 128 | 128 | 128 | 128 | 256 | 128 | 128 |

FIG. 5

| 128 | 128 | 128 | 128 | 128 | 256 | 128 |
|---|---|---|---|---|---|---|
| 128 | 128 | 128 | 128 | 256 | 0 | 256 |
| 128 | 128 | 128 | 256 | 0 | 0 | 0 |
| 128 | 128 | 128 | 128 | 256 | 0 | 256 |
| 128 | 128 | 128 | 128 | 128 | 256 | 128 |

FIG. 6

| 128 | 128 | 128 | 128 | 128 | 128 | 256 |
|---|---|---|---|---|---|---|
| 128 | 128 | 128 | 128 | 128 | 256 | 0 |
| 128 | 128 | 128 | 128 | 256 | 0 | 0 |
| 128 | 128 | 128 | 128 | 128 | 256 | 0 |
| 128 | 128 | 128 | 128 | 128 | 128 | 256 |

FIG. 7

| 128 | 128 | 128 | 128 | 128 | 128 | 128 |
|---|---|---|---|---|---|---|
| 128 | 128 | 128 | 128 | 128 | 128 | 256 |
| 128 | 128 | 128 | 128 | 128 | 256 | 0 |
| 128 | 128 | 128 | 128 | 128 | 128 | 256 |
| 128 | 128 | 128 | 128 | 128 | 128 | 128 |

FIG. 8

| 256 | 256 | 256 | 256 | 256 | 256 | 256 |
|---|---|---|---|---|---|---|
| 256 | 256 | 256 | 256 | 256 | 256 | 256 |
| 256 | 256 | 256 | 256 | 256 | 256 | 256 |
| 256 | 256 | 256 | 256 | 256 | 256 | 256 |
| 256 | 256 | 256 | 256 | 256 | 256 | 256 |

FIG. 9

| 160 | 160 | 160 | 160 | 256 | 160 | 160 |
|-----|-----|-----|-----|-----|-----|-----|
| 160 | 160 | 160 | 256 | 64  | 256 | 160 |
| 160 | 160 | 256 | 64  | 64  | 64  | 256 |
| 160 | 160 | 160 | 256 | 64  | 256 | 160 |
| 160 | 160 | 160 | 160 | 256 | 160 | 160 |

FIG. 10

| 192 | 192 | 192 | 192 | 192 | 256 | 192 |
|-----|-----|-----|-----|-----|-----|-----|
| 192 | 192 | 192 | 192 | 256 | 128 | 256 |
| 192 | 192 | 192 | 256 | 128 | 128 | 128 |
| 192 | 192 | 192 | 192 | 256 | 128 | 256 |
| 192 | 192 | 192 | 192 | 192 | 256 | 192 |

FIG. 11

| 224 | 224 | 224 | 224 | 224 | 224 | 256 |
|-----|-----|-----|-----|-----|-----|-----|
| 224 | 224 | 224 | 224 | 224 | 256 | 192 |
| 224 | 224 | 224 | 224 | 256 | 192 | 192 |
| 224 | 224 | 224 | 224 | 224 | 256 | 192 |
| 224 | 224 | 224 | 224 | 224 | 224 | 256 |

FIG. 12

| 224 | 224 | 224 | 256 | 224 | 224 | 224 |
|---|---|---|---|---|---|---|
| 224 | 224 | 256 | 192 | 256 | 224 | 224 |
| 224 | 256 | 192 | 192 | 192 | 256 | 224 |
| 224 | 224 | 256 | 192 | 256 | 224 | 224 |
| 224 | 224 | 224 | 256 | 224 | 224 | 224 |

FIG. 13

| 235 | 235 | 235 | 116 | 235 | 235 | 235 |
|---|---|---|---|---|---|---|
| 235 | 235 | 116 | 354 | 116 | 235 | 235 |
| 235 | 116 | 354 | 354 | 354 | 116 | 235 |
| 235 | 235 | 116 | 354 | 116 | 235 | 235 |
| 235 | 235 | 235 | 116 | 235 | 235 | 235 |

FIG. 14

| 0 | 256 |
|---|---|
| 256 | 0 |

FIG. 15

| 256 | 256 |
|---|---|
| 256 | 256 |

FIG. 16

| 128 | 256 |
|---|---|
| 256 | 128 |

| 192 | 256 |
|---|---|
| 256 | 192 |

| 149 | 299 |
|---|---|
| 299 | 149 |

| 96 | 160 |
|---|---|
| 160 | 90 |

WEIGHTED PREDICTION INFORMATION CALCULATION METHOD, APPARATUS, AND PROGRAM, AND VIDEO CODING METHOD, APPARATUS, AND PROGRAM

TECHNICAL FIELD

The present invention relates to a weighted prediction information calculation method, apparatus, and program for weighted prediction, and a video coding method, apparatus, and program.

BACKGROUND ART

Moving pictures have an enormous amount of information, and efficient compression coding is essential for recording and transmitting them. Video compression coding employs various elemental techniques. One of the elemental techniques is inter-frame prediction coding.

According to the inter-frame prediction coding technique, a picture (called a predicted picture) which approximates a picture to be currently coded (called a picture to be predicted) is generated using another coded picture (called a reference picture). A difference signal (called a prediction error picture) from the predicted picture is coded instead of an original picture signal.

A motion generally exists between frames, so it is popular to use a motion-compensated prediction coding technique to increase prediction efficiency using spatial displacement information. In general, moving pictures are highly correlated temporally and spatially, and can be compressed efficiently by motion-compensated prediction coding.

However, a high-accuracy predicted picture cannot be generated by only reflecting a spatial displacement when the signal amplitude varies over time, like a scene in which the illumination changes over time or a scene to which a fade effect (fade-in/fade-out) is applied as a kind of video special effect. A technique for increasing prediction efficiency in such a case is weighted prediction coding.

Weighted prediction coding is a technique of weighting the pixel value of a reference picture to generate a predicted picture in inter-frame prediction coding. A moving picture generally has a motion, and the weighted prediction coding technique is adopted in combination with the motion-compensated prediction coding technique. This combination will be called a weighted motion-compensated prediction coding technique.

The weighted motion-compensated prediction coding technique is employed as an international standard for a video coding scheme in reference 1 (H.264/MPEG-4 AVC: "Advanced Video Coding for Generic Audiovisual Services", (Switzerland), ITU-T, March 2005, Series H: Audiovisual and multimedia systems H.264, pp. 157-159). This technique implements high compression ratios in a scene to which a fade effect is applied.

According to the weighted motion-compensated prediction coding technique, letting $P_{ref}$ be a reference picture, T be a motion from the reference picture $P_{ref}$ to a picture to be predicted, and E be a picture in which all pixel values are "1" at the same resolution as that of $P_{ref}$, a predicted picture $P_{pred}$ is generated by liner calculation of equation (1) using a pair of weight w and offset o (called a weighting factor):

[Mathematical 1]

$$P_{pred} = wTP_{ref} + oE \quad (1)$$

Weighted prediction has a problem of how to calculate the weighting factor. For example, reference 2 (Japanese Patent Laid-Open No. 2005-217746 (p. 8, equation (11))) describes a method of calculating a weighting factor using equation (2). In equation (2), $P_{src}$ is i a picture to be predicted, $P_{ref}$ is a reference picture, and n is a pixel count. As characteristics closed in a picture P (intra-picture characteristics), $S_1(P)$ is the sum of pixel values, and $S_2(P)$ is the square sum of pixel values. Further, $C(P_0,P_1)$ is the product sum of pixel values between two pictures.

[Mathematical 2]

$$w = \frac{nC(P_{src}, P_{ref}) - S_1(P_{src})S_1(P_{ref})}{nS_2(P_{ref}) - S_1(P_{ref})^2} \quad (2)$$

$$o = \frac{S_1(P_{src}) - wS_1(P_{ref})}{n}$$

FIG. 3 is a block diagram showing an example of an apparatus (to be referred to as a conventional weighting factor calculation apparatus) which calculates a weighting factor using a conventional technique described in reference 2. In the example shown in FIG. 3, the conventional weighting factor calculation apparatus includes an intra-picture characteristic calculation means 101, frame buffer 102, inter-picture characteristic calculation means 103, and weighting factor calculation means 104.

The intra-picture characteristic calculation means 101 calculates intra-picture characteristics $S_1(P_{src})$ and $S_2(P_{src})$ in equation (2) using an input picture 1 ($P_{src}$). The intra-picture characteristic calculation means 101 stores the calculated intra-picture characteristics in the frame buffer 102 in association with an input picture 2. The intra-picture characteristic calculation means 101 transfers the calculated characteristics to the weighting factor calculation means 104. The input picture 1 is a picture to be predicted in weighted prediction. The input picture 2 is a reference picture used in weighted prediction of the input picture 1 for a subsequently input picture to be predicted. The input picture 2 is, e.g., the input picture 1 itself or another picture. For example, picture coding may use a picture obtained by lossily coding the input picture 1.

For past input pictures, the frame buffer 102 accumulates one or a plurality of pairs each having the input picture 2 and intra-picture characteristics calculated by the intra-picture characteristic calculation means 101. The frame buffer 102 receives a reference picture selection signal, and outputs N pairs out of accumulated pairs of pictures and intra-picture characteristics in accordance with the reference picture selection signal. The frame buffer 102 transfers pictures out of the pairs of pictures and intra-picture characteristics to the inter-picture characteristic calculation means 103, and inter-picture characteristics to the weighting factor calculation means 104.

The inter-picture characteristic calculation means 103 calculates N inter-picture characteristics $C(P_{src},P_{ref}(1)), \ldots, C(P_{src},P_{ref}(N))$ using N reference pictures $(P_{ref}(1), \ldots, P_{ref}(N))$ transferred from the frame buffer 102 in accordance with $P_{src}$ and the reference picture selection signal. The inter-picture characteristic calculation means 103 transfers the N calculated inter-picture characteristics to the weighting factor calculation means 104.

The weighting factor calculation means 104 calculates N pairs of weighting factors $(w(1),o(1)), \ldots, (w(N),o(N))$ corresponding to the N reference pictures based on equation (2) using the characteristics $S_1(P_{src}), S_1(P_{ref}(1)), \ldots, S_1(P_{ref}(N)), S_2(P_{src}), S_2(P_{ref}(1)), \ldots, S_2(P_{ref}(N))$, and $C(P_{src},P_{ref}(N))$ transferred from the intra-picture characteristic calculation means 101, frame buffer 102, and inter-picture characteristic calculation means 103. The weighting factor calculation means 104 outputs the N pairs of calculated weighting factors for use in weighted prediction.

The conventional technique described in reference 2 has been explained.

Methods for calculating a weighting factor without using inter-picture characteristics are described in reference 3 (Jill M. Boyce, "WEIGHTED PREDICTION IN THE H.264/MPEG AVC VIDEO CODING STANDARD", ISCAS '04, Proceedings of the 2004 International Symposium on Circuit and Systems, (USA), IEEE, May 23, 2004, Vol. 3, pp. 789-792, and reference 4 (Japanese Patent Laid-Open No. 2006-54802).

According to the method described in reference 3, a weighting factor is calculated using equation (3). In equation (3), M(P) is an index representing the DC component of a picture P. Typically, M(P) is an average pixel value and is equal to $S_1(P)/n$.

According to a method described in reference 5 (Japanese Patent Laid-Open No. 2004-7379 (p. 31, equations (17) and (18)), a weighting factor is calculated using equation (4). In equation (4), V(P) is an index representing the DC component of a picture P. Typically, V(P) is the average of difference absolute values of pixels of the picture P with respect to M(P), or the root-mean-square of differences of pixels of the picture P with respect to M(P).

[Mathematical 3]

$$w = \frac{M(P_{src})}{M(P_{ref})} \quad (3)$$

$$o = 0$$

[Mathematical 4]

$$w = \frac{V(P_{src})}{V(P_{ref})} \quad (4)$$

$$o = M(P_{src}) - M(P_{ref})$$

DISCLOSURE OF INVENTION

Problems to be Solved by the Invention

However, the conventional techniques suffer the following problems. The first problem of the method described in reference 2 is a large calculation amount necessary to calculate a weighting factor.

Especially, the calculation amount greatly increases owing to $C(P_{src}, P_{ref})$ which is the term of the product sum between the pixel value of a picture to be predicted and that of a reference picture in equation (2).

When it is designated to use N reference pictures for one picture to be predicted, the inter-picture characteristic calculation means 103 illustrated in FIG. 3 needs to calculate $C(P_{src}, P_{ref})$ separately for N pairs each having the picture to be predicted and a reference picture.

The second problem of the method described in reference 2 is poor accuracy of a calculated weighting factor when a scene contains a motion.

As described above, weighted prediction is often used in combination with motion-compensated prediction. When the combination of weighted prediction and motion-compensated prediction is used, both a weighting factor and motion vector need to be calculated. Which of the weighting factor and motion vector is derived first depends on the implementation. However, if no accurate weighting factor is obtained, it is difficult to calculate an accurate motion vector.

A weighting factor calculated by equation (2) while no accurate motion vector is obtained greatly decreases the accuracy of the term of the product sum $C(P_{src}, P_{ref})$ between the pixel value of a picture to be predicted and that of a reference picture. Particularly in a picture containing a fine texture, a weighting factor calculated based on equation (2) may greatly deviate from an optimum value when a calculated motion vector is even slightly inaccurate.

The problem of greatly decreasing accuracy for a moving scene will be explained with reference to examples shown in FIGS. 4 to 14.

FIGS. 4 to 8 show five pictures at successive timings among pictures which form a given moving picture of seven pixels in width and five pixels in height. Each pixel has a pixel value as shown in each square. The picture changes in order of FIGS. 4, 5, 6, 7, and 8 over time.

An example will be examined, in which a fade-out effect is applied to this scene to change it into a picture having a pixel value of 256, as shown in FIG. 9.

The scene starts fading out from FIG. 4, fades out linearly, and changes to the picture of FIG. 9 at the time of FIG. 8. In this case, FIG. 10 shows a fade picture at the time of FIG. 5, FIG. 11 shows one at the time of FIG. 6, and FIG. 12 shows one at the time of FIG. 7.

A case will be considered, in which weighted prediction is executed using the picture in FIG. 4 as the reference picture $P_{ref}$ and one in FIG. 12 as the picture $P_{src}$ to be predicted during a fade-out of a series of pictures in FIGS. 4, 10, 11, 12, and 9 described above.

Since the scene has a motion, a weighting factor is calculated independently of derivation of a motion vector. FIG. 13 shows a target picture to be generated as a predicted picture.

The characteristics $S_1$, $S_1$, and C are calculated from all pixel values in FIGS. 4 and 12 according to the method described in reference 2. A weighting factor calculated based on equation (2) using four significant digits is (w,o)=(−0.9299, 354.1).

This weighting factor is applied to the picture in FIG. 4, and the decimal part is rounded off, obtaining the predicted picture in FIG. 14. This predicted picture greatly deviates from the target predicted picture in FIG. 13 such that the texture is reversed.

As described above, the method described in reference 2 suffers a poor weighting factor calculation accuracy for a moving scene.

In this manner, the method described in reference 2 has the problems of both the calculation amount and accuracy. As a technique for improving accuracy, reference 4 discloses a method of increasing it by repeating derivation of a motion vector and calculation of a weighting factor.

However, the method described in reference 4 further increases the calculation amount. In addition, this method cannot solve the fundamental problem that even a small deviation of the motion vector produces a large weighting factor error. The method described in reference 4 may further decrease accuracy.

The methods described in references 3 and 5 can decrease the calculation amount, but cannot achieve a satisfactory accuracy. The method described in reference 2 decreases the accuracy of a moving scene. To the contrary, the methods described in references 3 and 5 cannot attain an accurate weighting factor even for a still scene.

The problem that no accurate weighting factor can be obtained even for a still scene will be explained with reference to examples shown in FIGS. 15 to 20.

FIG. 15 shows a picture of 2×2 pixels with a checkered texture formed from pixels of a value "0" and pixels of a value "256". FIG. 16 shows a picture of 2×2 pixels having the value "256". FIG. 17 shows an example of an intermediate picture when the picture in FIG. 15 fades out to one in FIG. 16 while it stands still. FIG. 18 shows an example of an intermediate picture during the fade-out.

A case will be examined, in which weighted prediction is performed using the picture in FIG. 17 as the reference picture $P_{ref}$ and one in FIG. 18 as the picture $P_{src}$ to be predicted during the fade-out. Unlike the foregoing example, the scene is still, so the picture in FIG. 17 directly serves as a target picture to be generated as a predicted picture.

According to the method described in reference 3, the average value of all pixels is set as M(P) in equation (3). A weighting factor calculated using four significant digits is (w,o)=(1.167, 0).

This weighting factor is applied to the reference picture shown in FIG. 17, and the decimal part is rounded off, obtaining a predicted picture shown in FIG. 19. This predicted picture entirely differs from the picture to be predicted in FIG. 18.

According to the method described in reference 5, the average value of all pixels is set as M(P) in equation (4), and the average value of difference absolute values of all pixels with respect to M(P) is set as V(P). Then, a weighting factor (w,o)=(0.5, 32) is attained.

Applying this weighting factor to the reference picture shown in FIG. 17 yields a predicted picture shown in FIG. 20. This predicted picture is different from the picture to be predicted in FIG. 18, too.

In this way, the methods described in references 3 and 5 cannot generate an accurate predicted picture even for a still scene.

This is because these methods have no theoretical grounding. References 3 and 5 describe only calculating a weighting factor in accordance with equations (3) and (4), respectively. These references do not mention any principle serving as the grounds of these methods.

As described above, the three conventional techniques suffer at least one of the problems of the calculation amount and accuracy.

It is, therefore, an object of the present invention to provide a weighting factor calculation method for solving the problems of the conventional methods and achieving a sufficiently small calculation amount and an accuracy high enough for predicted picture generation.

Means of Solution to the Problems

To solve these problems, the present invention provides a weighting factor calculation method of calculating a weighting factor in weighted prediction based on picture characteristics closed in a picture to be predicted and a reference picture, the method comprising calculating a weighting factor based on a correlation between the picture characteristics of the picture to be predicted and the picture characteristics of the reference picture that are derived from a fade picture generation principle. Accordingly, the present invention can achieve the above-described object.

More specifically, according to the present invention, there is provided a weighted prediction information calculation method of calculating a weighting factor so as to make a predicted picture generated by weighting at least one reference picture during a fade by the weighting factor approximate a picture to be predicted during the fade, the weighted prediction information calculation method comprising the first step of calculating characteristics of sequentially input pictures, the second step of storing the characteristics calculated in the first step in association with the input pictures, and the third step of calculating a weighting factor corresponding to each reference picture using characteristics respectively associated with a picture to be predicted serving as one of the input pictures and a reference picture serving as at least one of the input pictures, wherein in the third step, the weighting factor is calculated under a condition to generate a picture during a fade based on a linear sum of a given picture and a given single-color still picture.

According to the present invention, there is provided a weighted prediction information calculation apparatus which calculates a weighting factor so as to make a predicted picture generated by weighting at least one reference picture during a fade by the weighting factor approximate a picture to be predicted during the fade, the weighted prediction information calculation apparatus comprising characteristic calculation means for calculating characteristics of sequentially input pictures, characteristic storage means for storing the characteristics calculated by the characteristic calculation means in association with the input pictures, and weighting factor calculation means for calculating a weighting factor corresponding to each reference picture using characteristics respectively associated with a picture to be predicted serving as one of the input pictures and a reference picture serving as at least one of the input pictures, wherein the weighting factor calculation means calculates the weighting factor under a condition to generate a picture during a fade based on a linear sum of a given picture and a given single-color still picture.

Effects of the Invention

The present invention can obtain the weighting factor of a fade effect-applied scene with a small calculation amount at high accuracy.

The reason why the weighting factor calculation amount is small is that only characteristics closed in a single picture are used to calculate a weighting factor.

The reason why the weighting factor accuracy is high is that the weighting factor equation is based on the fade picture generation principle.

BRIEF DESCRIPTION OF DRAWINGS

FIG. 1 is a block diagram showing an example of the arrangement of a weighting factor calculation apparatus according to an exemplary embodiment of the present invention;

FIG. 2 is a view showing an example of a picture generated by applying a weighting factor obtained by the technique of the exemplary embodiment of the present invention to a picture shown in FIG. 4 to predict a picture shown in FIG. 13;

FIG. 3 is a block diagram showing an example of the arrangement of a conventional weighting factor calculation apparatus;

FIG. 4 is a view showing an example of a picture which forms a moving scene;

FIG. 5 is a view showing an example of a picture which forms a moving scene;

FIG. 6 is a view showing an example of a picture which forms a moving scene;

FIG. 7 is a view showing an example of a picture which forms a moving scene;

FIG. 8 is a view showing an example of a picture which forms a moving scene;

FIG. 9 is a view showing an example of a picture generated by applying a fade effect to the picture shown in FIG. 8;

FIG. 10 is a view showing an example of a picture generated by applying the fade effect to the picture shown in FIG. 5;

FIG. 11 is a view showing an example of a picture generated by applying the fade effect to the picture shown in FIG. 6;

FIG. 12 is a view showing an example of a picture generated by applying the fade effect to the picture shown in FIG. 7;

FIG. 13 is a view showing a target picture used to perform weighted prediction without motion compensation when predicting the picture shown in FIG. 12 using the picture shown in FIG. 4 as a reference picture;

FIG. 14 is a view showing an example of a picture generated by applying a weighting factor obtained by a technique described in reference 2 to the picture shown in FIG. 4 to predict the picture shown in FIG. 13;

FIG. 15 is a view showing an example of a fade picture in a still scene;

FIG. 16 is a view showing an example of a fade picture in a still scene;

BEST MODE FOR CARRYING OUT THE INVENTION

Figures 17, 18, 19, 20, 21:
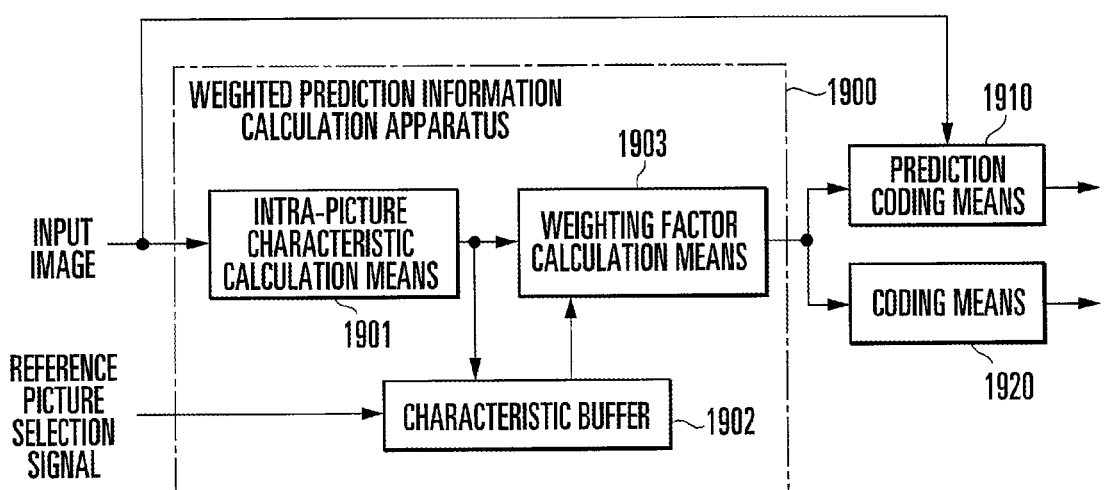
FIG. 17 is a view showing an example of a fade picture in a still scene.
FIG. 18 is a view showing an example of a fade picture in a still scene.
FIG. 19 is a view showing an example of a picture generated by applying a weighting factor obtained by a technique described in reference 3 to the picture shown in FIG. 17 to predict the picture shown in FIG. 18.
FIG. 20 is a view showing an example of a picture generated by applying a weighting factor obtained by a technique described in reference 5 to the picture shown in FIG. 17 to predict the picture shown in FIG. 18.
FIG. 21 is a block diagram showing the arrangement of a video coding apparatus.

A weighted prediction information calculation method according to an exemplary embodiment of the present invention calculates a weighting factor corresponding to each reference picture so as to make a predicted picture approximate a picture to be predicted by weighting a reference picture by the weighting factor when predicting one picture from at least one of arbitrary reference pictures. The weighted prediction information calculation method comprises the first step of calculating characteristics of sequentially input pictures, the second step of storing the characteristics calculated in the first step in association with the input pictures, and the third step of calculating a weighting factor corresponding to each reference picture using characteristics respectively associated with a picture to be predicted serving as one of the input pictures and a reference picture serving as at least one of the input pictures. In the third step, the weighting factor is calculated based on a fade picture generation principle.

In the third step, the weighting factor may be calculated by setting pictures at arbitrary timings during a fade as a picture to be predicted and a reference picture, based on a correlation derived from the fade picture generation principle for two pictures at arbitrary different timings during a fade, and letting $T(t_0,t_1)$ be a motion between pictures $P(t_0)$ and $P(t_1)$ at arbitrary timings $t_0$ and $t_1$ during a fade when a picture P(t) at an arbitrary timing t during the fade is generated by mixing a picture $P_{org}(t)$ and a single-color still picture cE having a pixel value c at a ratio r(t), the correlation derived from the fade picture generation principle may be expressed by equation (13) to be described later.

The weighting factor may include a term w by which a pixel value of a reference picture is multiplied to weight the pixel value of the reference picture, and a term o which is added to the pixel value of the reference picture to weight the pixel value of the reference picture, and in the third step, letting $M(P_{src})$ be a value representing a DC component in a picture to be predicted, $M(P_{ref})$ be a value representing a DC component in the reference picture, $V(P_{src})$ be a value representing an AC component in the picture to be predicted, and $V(P_{ref})$ be a value representing an AC component in the reference picture, (w,o) calculated using equation (7) to be described later may be set as the weighting factor.

A video coding method according to an exemplary embodiment of the present invention comprises the steps of calculating a weighting factor according to the weighted prediction information calculation method, performing weighted prediction coding for a moving picture using the calculated weighting factor, and coding the calculated weighting factor.

A weighted prediction information calculation apparatus according to an exemplary embodiment of the present invention calculates a weighting factor corresponding to each reference picture so as to make a predicted picture approximate a picture to be predicted by weighting a reference picture by the weighting factor when predicting one picture from at least one of arbitrary reference pictures. As shown in FIG. 1, the weighted prediction information calculation apparatus comprises a characteristic calculation means 1901 for calculating characteristics of sequentially input pictures, a characteristic storage means (characteristic buffer 1902) for storing the characteristics calculated by the characteristic calculation means 1901 in association with the input pictures, and a weighting factor calculation means 1903 for calculating a weighting factor corresponding to each reference picture using characteristics respectively associated with a picture to be predicted serving as one of the input pictures and a reference picture serving as at least one of the input pictures. The weighting factor calculation means calculates the weighting factor based on a fade picture generation principle.

The weighting factor calculation means may calculate the weighting factor by setting pictures at arbitrary timings during a fade as a picture to be predicted and a reference picture, based on a correlation derived from the fade picture generation principle for two pictures at arbitrary different timings during a fade, and letting $T(t_0,t_1)$ be a motion between pictures $P(t_0)$ and $P(t_1)$ at arbitrary timings $t_0$ and $t_1$ during a fade when a picture P(t) at an arbitrary timing t during the fade is generated by mixing a picture $P_{org}(t)$ and a single-color still picture cE having a pixel value c at a ratio r(t), the correlation derived from the fade picture generation principle may be expressed by equation (13) to be described later.

The weighting factor may include a term w by which a pixel value of a reference picture is multiplied to weight the pixel value of the reference picture, and a term o which is added to the pixel value of the reference picture to weight the pixel value of the reference picture, and letting $M(P_{src})$ be a value representing a DC component in a picture to be predicted, $M(P_{ref})$ be a value representing a DC component in the reference picture, $V(P_{src})$ be a value representing an AC component in the picture to be predicted, and $V(P_{ref})$ be a value representing an AC component in the reference picture, the weighting factor calculation means may calculate (w,o) as the weighting factor using equation (7) to be described later.

As shown in FIG. 21, a video coding apparatus according to an exemplary embodiment of the present invention comprises a weighted prediction information calculation apparatus 1900, a prediction coding means 1910 for performing weighted prediction coding for a moving picture using the weighting factor calculated by the weighted prediction information calculation apparatus 1900, and a coding means 1920 for coding the weighting factor calculated by the weighted prediction information calculation apparatus 1900.

A weighted prediction information calculation program according to an exemplary embodiment of the present invention calculates a weighting factor corresponding to each reference picture so as to make a predicted picture approximate a picture to be predicted by weighting a reference picture by the weighting factor when predicting one picture from at least one of arbitrary reference pictures. The weighted prediction information calculation program causes a computer to execute characteristic calculation processing of calculating characteristics of sequentially input pictures, storage processing of storing the characteristics calculated in the characteristic calculation processing in a storage means in association with the input pictures, and weighting factor calculation processing of calculating a weighting factor corresponding to each reference picture using characteristics respectively associated with a picture to be predicted serving as one of the input pictures and a reference picture serving as at least one of the input pictures. In the weighting factor calculation processing, the weighting factor is calculated based on a fade picture generation principle.

The program may cause the computer to, in the weighting factor calculation processing, calculate the weighting factor by setting pictures at arbitrary timings during a fade as a picture to be predicted and a reference picture, based on a correlation derived from the fade picture generation principle for two pictures at arbitrary different timings during a fade, and letting $T(t_0,t_1)$ be a motion between pictures $P(t_0)$ and $P(t_1)$ at arbitrary timings $t_0$ and $t_1$ during a fade when a picture $P(t)$ at an arbitrary timing t during the fade is generated by mixing a picture $P_{org}(t)$ and a single-color still picture cE having a pixel value c at a ratio r(t), the correlation derived from the fade picture generation principle may be expressed by equation (13) to be described later.

The weighting factor may include a term w by which a pixel value of a reference picture is multiplied to weight the pixel value of the reference picture, and a term o which is added to the pixel value of the reference picture to weight the pixel value of the reference picture, and in the weighting factor calculation processing, letting $M(P_{src})$ be a value representing a DC component in a picture to be predicted, $M(P_{ref})$ be a value representing a DC component in the reference picture, $V(P_{src})$ be a value representing an AC component in the picture to be predicted, and $V(P_{ref})$ be a value representing an AC component in the reference picture, (w,o) calculated using equation (7) to be described later may be set as the weighting factor.

A video coding program according to an exemplary embodiment of the present invention causes a computer to execute processing of calculating a weighting factor in accordance with the weighted prediction information calculation program, processing of performing weighted prediction coding for a moving picture using the calculated weighting factor, and processing of coding the calculated weighting factor.

An exemplary embodiment of the present invention will now be described in detail with reference to the accompanying drawings. FIG. 1 is a block diagram showing an example of the arrangement of a weighting factor calculation apparatus according to the exemplary embodiment of the present invention.

As shown in FIG. 1, the weighting factor calculation apparatus according to the exemplary embodiment of the present invention includes an intra-picture characteristic calculation means 1901, characteristic buffer 1902, and weighting factor calculation means 1903.

The weighting factor calculation apparatus is implemented by a computer incorporating a CPU which executes processing according to a program. The intra-picture characteristic calculation means 1901 and weighting factor calculation means 1903 are implemented by, e.g., the CPU. The characteristic buffer 1902 is implemented by, e.g., a memory and memory controller.

The weighting factor calculation apparatus may incorporate a weighted prediction information calculation program which causes a computer to execute characteristic calculation processing of calculating the characteristics of sequentially input pictures, storage processing of storing the characteristics calculated in the characteristic calculation processing in association with the input pictures, and weighting factor calculation processing of calculating a weighting factor corresponding to each reference picture using characteristics respectively associated with a picture to be predicted serving as one of the input pictures and a reference picture serving as one or a plurality of pictures out of the input pictures. In the weighting factor calculation processing, the weighting factor is calculated based on a fade picture generation principle.

The intra-picture characteristic calculation means 1901 sets a picture to be predicted in weighted prediction as an input picture (to be referred to as $P_{src}$). The intra-picture characteristic calculation means 1901 calculates a characteristic $M(P_{src})$ representing the DC component of the input picture $P_{src}$, and a characteristic $V(P_{src})$ representing the AC component of the input picture $P_{src}$. The intra-picture characteristic calculation means 1901 stores the pair of calculated characteristics M and V in the characteristic buffer 1902.

The intra-picture characteristic calculation means 1901 transfers the pair of calculated characteristics M and V to the weighting factor calculation means 1903. M and V are calculated in accordance with equations (5) and (6). In equations (5) and (6), pixnum(P) is the pixel count of the picture P, and k is an arbitrary positive constant. Typically, k=1 is used.

[Mathematical 5]

$$M(P) = \frac{1}{pixnum(P)} \sum_{p \in P} p \quad (5)$$

[Mathematical 6]

$$V(P) = \left( \frac{1}{pixnum(P)} \sum_{p \in P} |p - M(P)|^k \right)^{\frac{1}{k}} \quad (6)$$

For past input pictures, the characteristic buffer 1902 accumulates a plurality of characteristics calculated by the intra-picture characteristic calculation means 1901. The characteristic buffer 1902 receives a reference picture selection signal, and transfers, to the weighting factor calculation means 1903, N pairs of characteristics obtained in association with N reference pictures (to be referred to as $P_{ref}(1), \ldots, P_{ref}(N)$) designated by the reference picture selection signal.

The weighting factor calculation means 1903 calculates N pairs of weighting factors $(w(1),o(1)), \ldots, (w(N),o(N))$ corresponding to the N reference pictures based on equation (7) using the characteristics $M(P_{src})$, $M(P_{ref}(1))$, ..., $M(P_{ref}(N))$, and $V(P_{src})$, $V(P_{ref}(1))$, ..., $V(P_{ref}(N))$ transferred from the intra-picture characteristic calculation means 1901 and characteristic buffer 1902. The weighting factor calculation means 1903, i.e., the weighting factor calculation apparatus shown in FIG. 1 outputs the N pairs of calculated weighting factors.

[Mathematical 7]

$$w = \frac{V(P_{src})}{V(P_{ref})} \quad (7)$$

$$o = M(P_{src}) - \frac{V(P_{src})}{V(P_{ref})} M(P_{ref})$$

The weighting factor (w,o) output from the weighting factor calculation apparatus can be applied to, e.g., equation (8) to generate a predicted picture $P_{pred}$ which approximates the picture $P_{src}$ to P t be predicted from the reference picture $P_{ref}$ in a fade scene:

[Mathematical 8]

$$P_{pred} = wP_{ref} + oE \quad (8)$$

In equation (8), E is a picture in which all pixel values are "1" at the same resolution as those of $P_{src}$ and $P_{ref}$. Alternatively, the weighting factor (w,o) output from the weighting factor calculation apparatus can be applied to equation (9), which is identical to equation (1) described in Background Art, to generate a predicted picture $P_{pred}$ which approximates the picture $P_{src}$ to be predicted from the reference picture $P_{ref}$ in a moving fade scene:

[Mathematical 9]

$$P_{pred} = wTP_{ref} + oE \quad (9)$$

Equation (9) expresses a motion between $P_{src}$ and $P_{ref}$.

A comparison between the weighting factor calculation apparatus shown in FIG. 1 and the conventional weighting factor calculation apparatus shown in FIG. 3 reveals that the weighting factor calculation apparatus shown in FIG. 1 according to the exemplary embodiment of the present invention does not include the inter-picture characteristic calculation means 103, unlike the conventional weighting factor calculation apparatus shown in FIG. 3. The weighting factor calculation apparatus shown in FIG. 1 can therefore greatly reduce the calculation amount necessary to calculate a weighting factor.

Equation (7) is based on the fade picture generation principle. The predicted picture $P_{pred}$ which approximates the picture $P_{src}$ to be predicted at high accuracy in a fade scene can be obtained by applying the weighting factor (w,o) calculated based on equation (7) to equation (8) or (9).

The reason why equation (7) is based on the fade picture generation principle will be explained in detail.

A fade effect is generated by mixing a moving picture to be faded and a still picture of a single color such as black or white at a ratio which changes over time.

Let $P_{org}(t)$ be a picture at the timing t of an original moving picture after a fade-in or before a fade-out, cE (c represents a pixel value) be a single-color still picture after a fade-out or before a fade-in, and r(t) be a mixing ratio at the timing t.

Then, a mixed picture P(t) at the timing t during a fade is given by equation (10). Equation (10) expresses the fade picture generation principle. In weighting factor calculation, P(t) is an input picture, and $P_{org}(t)$ and cE are unknown.

Hence, it suffices to derive a relationship between mixed pictures P(t) at different timings t.

[Mathematical 10]

$$P(t) = r(t)P_{org}(t) + (1-r(t))cE \quad (10)$$

In general, a moving picture has a motion even during a fade. The motion between pictures at different timings $t_0$ and $t_1$ during a fade of an original picture is given by a transform $T(t_0,t_1)$ which satisfies equation (11). Note that the transform $T(t_0,t_1)$ satisfies equation (12) on the premise that it does not change the amplitude of a picture signal.

[Mathematical 11]

$$P_{org}(t_0) = T(t_0,t_1)P_{org}(t_1) \quad (11)$$

[Mathematical 12]

$$T(t_0,t_1)E = E \quad (12)$$

Different timings $t_0$ and $t_1$ during a fade are substituted into equation (10). The unknown picture $P_{org}(t)$ is eliminated from the resultant equation using the relation of equation (11). Then, a correlation given by equation (13) is established for two arbitrary pictures $P(t_0)$ and $P(t_1)$ during a fade:

[Mathematical 13]

$$P(t_0) = \frac{r(t_0)}{r(t_1)} T(t_0, t_1) P(t_1) + \frac{(r(t_1) - r(t_0))}{r(t_1)} cE \quad (13)$$

From equations (13) and (9), an ideal weighting factor (w,o) to be calculated for $P(t_0)$ serving as a picture to be predicted and $P(t_1)$ serving as a reference picture satisfies equation (14):

[Mathematical 14]

$$w = \frac{r(t_0)}{r(t_1)} \quad (14)$$

$$o = \frac{(r(t_1) - r(t_0))}{r(t_1)} c$$

By using equations (6) and (10), the relation of equation (15) is established for V(P(t)) and $V(P_{org}(t))$. The relation of equation (16) is derived for $V(P(t_0))$ and $V(P(t_1))$.

[Mathematical 15]

$$V(P(t)) = r(t)V(P_{org}(t)) \quad (15)$$

[Mathematical 16]

$$\frac{V(P(t_0))}{V(P(t_1))} = \frac{r(t_0)V(P_{org}(t_0))}{r(t_1)V(P_{org}(t_1))} \quad (16)$$

The relation of equation (17) is derived from equation (13) for $M(P(t_0))$ and $M(T(t_0,t_1)P(t_1))$.

[Mathematical 17]

$$M(P(t_0)) = \frac{r(t_0)}{r(t_1)} M(T(t_0, t_1)P(t_1)) + \frac{(r(t_1) - r(t_0))}{r(t_1)} c \quad (17)$$

Eliminating $r(t_0)$, $r(t_i)$, and c from equations (14), (16), and (17) yields equation (18):

[Mathematical 18]

$$w = \frac{V(P(t_0))V(P_{org}(t_1))}{V(P(t_1))V(P_{org}(t_0))} \quad (18)$$

$$o = M(P(t_0)) - \frac{V(P(t_0))V(P_{org}(t_1))}{V(P(t_1))V(P_{org}(t_0))} M(T(t_0,t_1)P(t_1))$$

In equation (18), $V(P_{org}(t_0))$, $V(P_{org}(t_1))$, and $M(T(t_0,t_1)P(t_1))$ still remain as unknown values.

However, the AC components $V(P_{org}(t_0))$ and $V(P_{org}(t_1))$ of respective pictures can be regarded to be almost equal except for a case in which a very large motion exceeding one frame exists between $P_{org}(t_0)$ and $P_{org}(t_1)$ and a case in which the feature of a picture greatly changes due to a scene change.

The DC component $M(T(t_0,t_1)P(t_1))$ of the picture $T(t_0,t_1)P(t_1)$ obtained by applying the motion between timings $t_0$ and $t_1$ to $P(t_1)$ is also regarded to be almost equal to $M(P(t_1))$.

Assuming that the AC components of respective pictures are equal to each other, their DC components are also equal to each other, and equations (19) and (20) are established, equation (18) can be rewritten into equation (21):

[Mathematical 19]

$$V(P_{org}(t_0)) = V(P_{org}(t_1)) \quad (19)$$

[Mathematical 20]

$$M(T(t_0,t_1)P(t_1)) = M(P(t_1)) \quad (20)$$

[Mathematical 21]

$$w = \frac{V(P(t_0))}{V(P(t_1))} \quad (21)$$

$$o = M(P(t_0)) - \frac{V(P(t_0))}{V(P(t_1))} M(P(t_1))$$

From the above description, equation (7) can express the weighting factor (w,o) based on the fade picture generation principle when $P_{src}$ is a picture to be predicted and $P_{ref}$ is a reference picture.

The exemplary embodiment uses the weighting factor equation based on the fade picture generation principle. Compared to the conventional technique having no theoretical grounding, the exemplary embodiment can calculate a weighting factor capable of generating a high-accuracy predicted picture for a fade picture.

The reason why the accuracy of a predicted picture is actually high will be explained with reference to examples in FIGS. 15 to 18.

Similar to execution examples of the conventional techniques described in references 3 and 5, a picture in FIG. 15 fades out to one in FIG. 16 while it stands still. Assume that an intermediate picture in FIG. 17 during the fade-out is set as the reference picture $P_{ref}$, and an intermediate picture in FIG. 18 is set as the picture $P_{src}$ to be predicted.

The characteristics M and V of the picture $P_{src}$ in FIG. 18 are calculated according to equations (5) and (6):

$M(P_{src})=224$, $V(P_{src})=32$

Similarly, the characteristics M and V of the picture $P_{ref}$ in FIG. 17 are calculated according to equations (5) and (6):

$M(P_{ref})=192$, $V(P_{ref})=64$

Substituting these values into equation (7) yields (w,o)=(0.5, 128).

This weighting factor is applied to the reference picture $P_{ref}$ in FIG. 17 to generate a predicted picture in accordance with equation (8):

$128\times0.5+128=192$, $256\times0.5+128=256$

The generated picture matches the picture $P_{src}$ to be predicted in FIG. 18.

In this fashion, the exemplary embodiment can calculate a weighting factor capable of generating a high-accuracy predicted picture, in comparison with the methods described in references 3 and 5.

The exemplary embodiment uses not the characteristics between pictures but only the characteristics of an entire picture that are closed in each picture. The exemplary embodiment can calculate a weighting factor capable of generating a high-accuracy predicted picture even for a moving scene, unlike the conventional technique described in reference 2 with reference to FIG. 3 and equation (2).

The reason why the accuracy of a predicted picture is actually high will be explained with reference to examples in FIGS. 4 to 13 and 2.

Similar to an execution example of the conventional technique described in reference 2, a case will be considered, in which weighted prediction is done using a picture shown in FIG. 4 as the reference picture $P_{ref}$ and one shown in FIG. 12 as the picture $P_{src}$ to be predicted during a fade-out of a series of pictures shown in FIGS. 4, 10, 11, 12, and 9.

Since the scene has a motion, a weighting factor is calculated independently of derivation of a motion vector. FIG. 13 shows a target picture to be generated as a predicted picture.

The characteristics $M(P_{ref})$ and $V(P_{ref})$ of the picture $P_{ref}$ shown in FIG. 4 and the characteristics $M(P_{src})$ and $V(P_{src})$ of the picture $P_{src}$ shown in FIG. 12 are calculated for k=1 according to equations (5) and (6). The calculated characteristics are applied to equation (7) using four significant digits, obtaining a weighting factor (w,o)=(0.1660, 201.8).

This weighting factor is applied to the reference picture $P_{ref}$ shown in FIG. 4, and the decimal part of the calculation result of equation (8) is rounded off, generating a predicted picture:

$0\times0.1660+201.8\approx202$, $128\times0.1660+201.8\approx223$, and $256\times0.1660+201.8\approx244$.

Consequently, a predicted picture shown in FIG. 2 is attained.

The predicted picture shown in FIG. 2 does not completely coincide with a target picture shown in FIG. 13, but is much closer to the picture shown in FIG. 13 than a picture shown in FIG. 14 that is generated by the method described in reference 2.

More specifically, the mean square error of the picture shown in FIG. 14 from one shown in FIG. 13 is 8308. To the contrary, the mean square error of the picture shown in FIG. 2 from one shown in FIG. 13 is 45.60, which is smaller by two orders of magnitude.

Compared to the method described in reference 2, the exemplary embodiment can calculate a weighting factor capable of generating a high-accuracy predicted picture even for a moving scene.

The exemplary embodiment uses only characteristics closed in a picture, and can calculate a weighting factor with a smaller calculation amount than that of the method described in reference 2 which is a conventional weighting factor calculation technique having theoretical grounding.

The exemplary embodiment uses values calculated by equations (5) and (6) as the characteristics M and V. However, the present invention is not limited to the definitions of equations (5) and (6).

From the description of the operation in the exemplary embodiment, equation (7) is based on the fade picture generation principle when the characteristic V meets equation (15).

That is, the definition of the characteristic V may be another one satisfying equation (15). For example, the characteristic V may be derived using the difference absolute value between neighboring pixels, instead of the difference absolute value of a pixel from an average value.

More specifically, letting p(x) be a pixel at a coordinate x on a picture, δ be an arbitrary coordinate difference, and pixnum(x,δ) be the number of coordinates x at which both the coordinates x and x+δ fall within the picture region of a picture X, the characteristic V may be calculated in accordance with equation (22):

[Mathematical 22]

$$V(P) = \left( \frac{1}{pixnum(P, \delta)} \sum_{p(x),p(x+\delta) \in P} |p(x) - p(x+\delta)|^k \right)^{\frac{1}{k}} \quad (22)$$

[Mathematical 23]

$$M(P) = \frac{1}{pixnum(trans(P))} \sum_{p \in trans(P)} p \quad (23)$$

[Mathematical 24]

$$V(P) = \left( \frac{1}{pixnum(trans(P))} \sum_{p \in trans(P)} |p - M(P)|^k \right)^{\frac{1}{k}} \quad (24)$$

[Mathematical 25]

$$V(P) = \left( \frac{1}{pixnum(trans(P), \delta)} \sum_{p(x),p(x+\delta) \in trans(P)} |p(x) - p(x+\delta)|^k \right)^{\frac{1}{k}} \quad (25)$$

M and V may also be calculated from a plurality of partial pictures of the picture P. This is represented by equation (26) and equation (27) or (28). In equations (26), (27), and (28), $\alpha_i$ is an arbitrary positive constant, and $sub_i(P)$ is the ith partial picture of some pixels extracted from the picture P.

[Mathematical 26]

$$M(P) = \frac{1}{\sum_{i=1}^{I} \alpha_i} \sum_{i=1}^{I} \frac{\alpha_i}{pixnum(trans(sub_i(P)))} \sum_{p \in trans(sub_i(P))} p \quad (26)$$

[Mathematical 27]

$$V(P) = \left( \frac{1}{\sum_{i=1}^{I} \alpha_i} \sum_{i=1}^{I} \frac{\alpha_i}{pixnum(trans(sub_i(P)))} \sum_{p \in trans(sub_i(P))} |p - M(P)|^k \right)^{\frac{1}{k}} \quad (27)$$

[Mathematical 28]

$$V(P) = \left( \frac{1}{\sum_{i=1}^{I} \alpha_i} \sum_{i=1}^{I} \frac{\alpha_i}{pixnum(trans(sub_i(P)), \delta)} \sum_{p(x),p(x+\delta) \in trans(sub_i(P))} |p(x) - p(x+\delta)|^k \right)^{\frac{1}{k}} \quad (28)$$

By using equations (22) and (10), the relation of equation (15) is established for V(P(t)) and V($P_{org}$(t)). As is apparent from this, the exemplary embodiment stands on the fade picture generation principle even when the characteristic V complies not with the definition of equation (6) but with that of equation (22).

For example, M and V may be calculated using not all pixels but some pixels contained in the picture P, or calculated from a picture having undergone transform such as reduction or emphasis.

This is represented by equation (23) and equation (24) or (25). In equations (23), (24), and (25), pixnum(X) is the pixel count of a picture X, and trans(P) is a picture obtained by performing an arbitrary transform such as partial picture extraction, decimation, reduction, or emphasis for the picture P.

Further, as described above, the characteristic V suffices to meet equation (21). As long as the characteristic V satisfies equation (15), the result of performing an arbitrary linear operation for the characteristic V, i.e., the result of multiplication or division by an arbitrary constant, or addition or subtraction of characteristics also meets equation (15).

Thus, the characteristic V may be the sum of the result of equation (6), (22), (24), (25), (27), or (28) and that of an arbitrary linear operation.

As described above, the exemplary embodiment can calculate a weighting factor capable of generating a high-accuracy predicted picture in weighted prediction. The exemplary embodiment can be applied to video compression coding employing a weighted prediction coding technique. According to the exemplary embodiment, a weighting factor is calculated, weighted prediction coding is performed for a moving picture using the calculated weighting factor, and the moving picture is coded together with the calculated weighting factor. The exemplary embodiment can therefore increase the compression efficiency of the moving picture.

The present invention has been described with reference to the exemplary embodiment, but is not limited to the above-described exemplary embodiment. The arrangement and details of the invention can be variously modified within the scope of the invention, and these modifications will readily occur to those skilled in the art.

Industrial Applicability

The exemplary embodiment is suited to efficient compression-coding of a scene in which the illumination changes over time or a scene to which a fade effect is applied as a kind of video special effect in video compression coding using a weighted prediction coding technique such as H.264/MPEG-4 AVC. The exemplary embodiment has a significant effect capable of deriving parameters necessary for weighted prediction with a sufficiently small calculation amount at an accuracy high enough for predicted picture generation. The fade effect is used in the production sites of various video contents including movies and television programs. Thus, the apparatus and method of the exemplary embodiment are available in a wide range of industries using video compression coding. For example, the apparatus and method of the exemplary embodiment are applicable to broadcasting, Internet streaming, creation of video packages such as DVD®, home video recorders, and the like.

This application is the National Phase of PCT/JP2008/053874 filed on Mar. 4, 2008, which is based upon and claims the benefit of priority from Japanese patent application No. 2007-54605, filed on Mar. 5, 2007, and Japanese patent application No. 2008-5636, filed on Jan. 15, 2008, the disclosure of which is incorporated herein in its entirety by reference.

The invention claimed is:

1. A weighted prediction information calculation method comprising:
the first step of calculating characteristics of sequentially input pictures;
the second step of storing the characteristics calculated in the first step in association with the input pictures; and
the third step of calculating a weighting factor corresponding to each reference picture using characteristics respectively associated with a picture to be predicted serving as one of the input pictures and a reference picture serving as at least one of the input pictures, the third step including the step of calculating the weighting factor under a condition that a picture during a fade is generated based on a linear sum of a given picture and a given single-color still picture.

2. The weighted prediction information calculation method according to claim 1, wherein
the third step includes the step of calculating the weighting factor by setting pictures at arbitrary timings during a fade as a picture to be predicted and a reference picture, based on a correlation derived from the fade picture generation principle for two pictures at arbitrary different timings during a fade, and
letting $T(t_0,t_1)$ be a motion between pictures $P(t_0)$ and $P(t_1)$ at arbitrary timings $t_0$ and $t_1$ during a fade when a picture $P(t)$ at an arbitrary timing t during the fade is generated by mixing a picture $P_{org}(t)$ and a single-color still picture $cE$ having a pixel value c at a ratio $r(t)$, the correlation derived from the fade picture generation principle is given by $$P(t_0) = \frac{r(t_0)}{r(t_1)}T(t_0,t_1)P(t_1) + \frac{(r(t_1)-r(t_0))}{r(t_1)}cE. \quad (1)$$

3. The weighted prediction information calculation method according to claim 1, wherein
the weighting factor includes a term w by which a pixel value of a reference picture is multiplied to weight the pixel value of the reference picture, and a term o which is added to the pixel value of the reference picture to weight the pixel value of the reference picture, and
the third step includes the step of, letting $M(P_{src})$ be a value representing a DC component in a picture to be predicted, $M(P_{ref})$ be a value representing a DC component in the reference picture, $V(P_{src})$ be a value representing an AC component in the picture to be predicted, and $V(P_{ref})$ be a value representing an AC component in the reference picture, calculating (w,o) using equation (2) as the weighting factor:

$$w = \frac{V(P_{src})}{V(P_{ref})} \quad (2)$$

$$o = M(P_{src}) - \frac{V(P_{src})}{V(P_{ref})}M(P_{ref}).$$

4. The weighted prediction information calculation method according to claim 3, further comprising the step of calculating the AC component in the picture from a difference value between a pixel in the picture and the DC component.

5. The weighted prediction information calculation method according to claim 3, further comprising the step of calculating the AC component in the picture from a difference value between a pixel in the picture and a pixel near the pixel.

6. A video coding method comprising:
the first step of calculating characteristics of sequentially input pictures;
the second step of storing the characteristics calculated in the first step in association with the input pictures;
the third step of calculating a weighting factor corresponding to each reference picture using characteristics respectively associated with a picture to be predicted serving as one of the input pictures and a reference picture serving as at least one of the input pictures, the third step including the step of calculating the weighting factor under a condition that a picture during a fade is generated based on a linear sum of a given picture and a given single-color still picture;
the step of performing weighted prediction coding for a moving picture using the calculated weighting factor; and
the step of coding the calculated weighting factor.

7. A weighted prediction information calculation apparatus comprising:
a characteristic calculation unit which calculates characteristics of sequentially input pictures;
a characteristic storage unit which stores characteristics calculated by said characteristic calculation unit in association with the input pictures; and
a weighting factor calculation unit which calculates a weighting factor corresponding to each reference picture using characteristics respectively associated with a picture to be predicted serving as one of the input pictures and a reference picture serving as at least one of the input pictures, said weighting factor calculation unit calculating the weighting factor under a condition that a picture during a fade is generated based on a linear sum of a given picture and a given single-color still picture.

8. The weighted prediction information calculation apparatus according to claim 7, wherein
said weighting factor calculation unit calculates the weighting factor by setting pictures at arbitrary timings during a fade as a picture to be predicted and a reference picture, based on a correlation derived from the fade picture generation principle for two pictures at arbitrary different timings during a fade, and
letting $T(t_0,t_1)$ be a motion between pictures $P(t_0)$ and $P(t_1)$ at arbitrary timings $t_0$ and $t_1$ during a fade when a picture $P(t)$ at an arbitrary timing t during the fade is generated by mixing a picture $P_{org}(t)$ and a single-color still picture $cE$ having a pixel value c at a ratio $r(t)$, the correlation derived from the fade picture generation principle is given by $$P(t_0) = \frac{r(t_0)}{r(t_1)} T(t_0, t_1) P(t_1) + \frac{(r(t_1) - r(t_0))}{r(t_1)} cE. \quad (3)$$

9. The weighted prediction information calculation apparatus according to claim 7, wherein
the weighting factor includes a term w by which a pixel value of a reference picture is multiplied to weight the pixel value of the reference picture, and a term o which is added to the pixel value of the reference picture to weight the pixel value of the reference picture, and
letting $M(P_{src})$ be a value representing a DC component in a picture to be predicted, $M(P_{ref})$ be a value representing a DC component in the reference picture, $V(P_{src})$ be a value representing an AC component in the picture to be predicted, and $V(P_{ref})$ be a value representing an AC component in the reference picture, said weighting factor calculation unit calculates (w,o) using equation (4) as the weighting factor:

$$w = \frac{V(P_{src})}{V(P_{ref})} \quad (4)$$
$$o = M(P_{src}) - \frac{V(P_{src})}{V(P_{ref})} M(P_{ref}).$$

10. The weighted prediction information calculation apparatus according to claim 9, wherein said weighting factor calculation unit calculates the AC component in the picture from a difference value between a pixel in the picture and the DC component.

11. The weighted prediction information calculation apparatus according to claim 9, wherein said weighting factor calculation unit calculates the AC component in the picture from a difference value between a pixel in the picture and a pixel near the pixel.

12. A video coding apparatus comprising:
a characteristic calculation unit which calculates characteristics of sequentially input pictures;
a characteristic storage unit which stores characteristics calculated by said characteristic calculation unit in association with the input pictures;
a weighting factor calculation unit which calculates a weighting factor corresponding to each reference picture using characteristics respectively associated with a picture to be predicted serving as one of the input pictures and a reference picture serving as at least one of the input pictures, said weighting factor calculation unit calculating the weighting factor under a condition that a picture during a fade is generated based on a linear sum of a given picture and a given single-color still picture;
a prediction coding unit which performs weighted prediction coding for a moving picture using the calculated weighting factor; and
a coding unit which codes the calculated weighting factor.

13. A weighted prediction information calculation apparatus comprising:
characteristic calculation means for calculating characteristics of sequentially input pictures;
characteristic storage means for storing the characteristics calculated by said characteristic calculation means in association with the input pictures; and
weighting factor calculation means for calculating a weighting factor corresponding to each reference picture using characteristics respectively associated with a picture to be predicted serving as one of the input pictures and a reference picture serving as at least one of the input pictures, said weighting factor calculation means calculating the weighting factor under a condition that a picture during a fade is generated based on a linear sum of a given picture and a given single-color still picture.

14. A video coding apparatus comprising:
characteristic calculation means for calculating characteristics of sequentially input pictures;
characteristic storage means for storing the characteristics calculated by said characteristic calculation means in association with the input pictures;
weighting factor calculation means for calculating a weighting factor corresponding to each reference picture using characteristics respectively associated with a picture to be predicted serving as one of the input pictures and a reference picture serving as at least one of the input pictures, said weighting factor calculation means calculating the weighting factor under a condition that a picture during a fade is generated based on a linear sum of a given picture and a given single-color still picture;
prediction coding means for performing weighted prediction coding for a moving picture using the calculated weighting factor; and
coding means for coding the calculated weighting factor.

* * * * *